Oct. 28, 1958     R. WINKLER ET AL     2,857,857
MACHINE FOR USE IN THE PRODUCTION OF CONFECTIONERY
Filed June 17, 1954     3 Sheets-Sheet 1
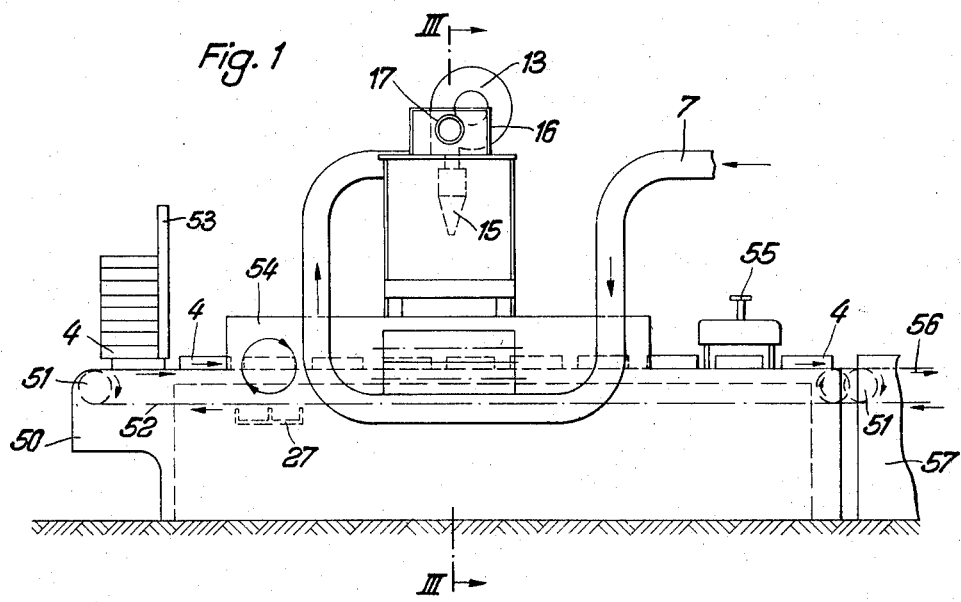
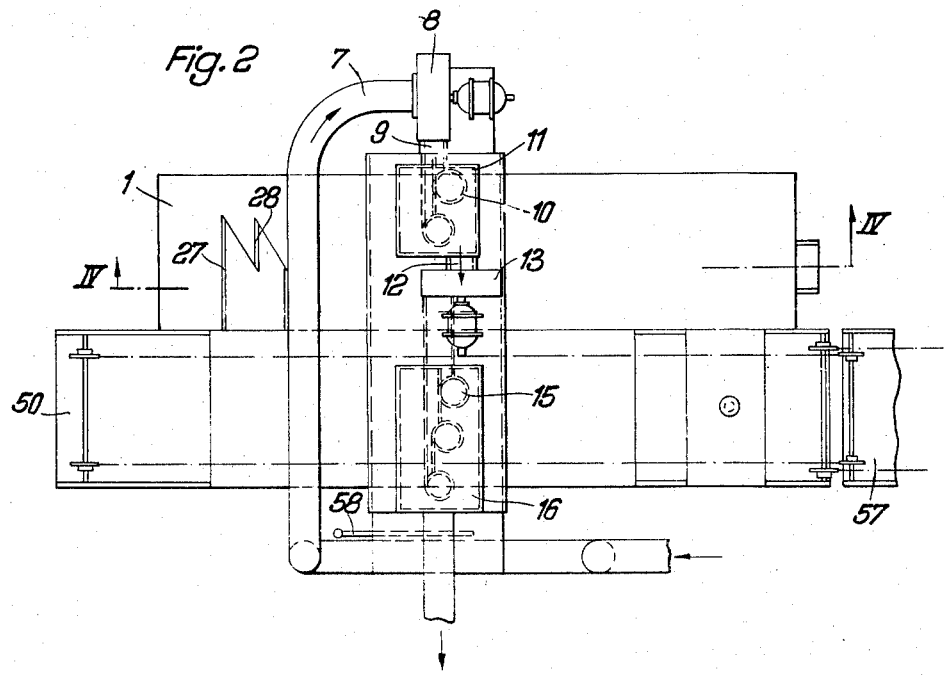
Inventors
RICHARD WINKLER
KURT DÜNNEBIER
By    *Fredrick P. Hans*
ATTORNEY Oct. 28, 1958     R. WINKLER ET AL     2,857,857
MACHINE FOR USE IN THE PRODUCTION OF CONFECTIONERY
Filed June 17, 1954     3 Sheets-Sheet 2

Inventor:
RICHARD WINKLER
KURT DÜNNEBIER
ATTORNEY

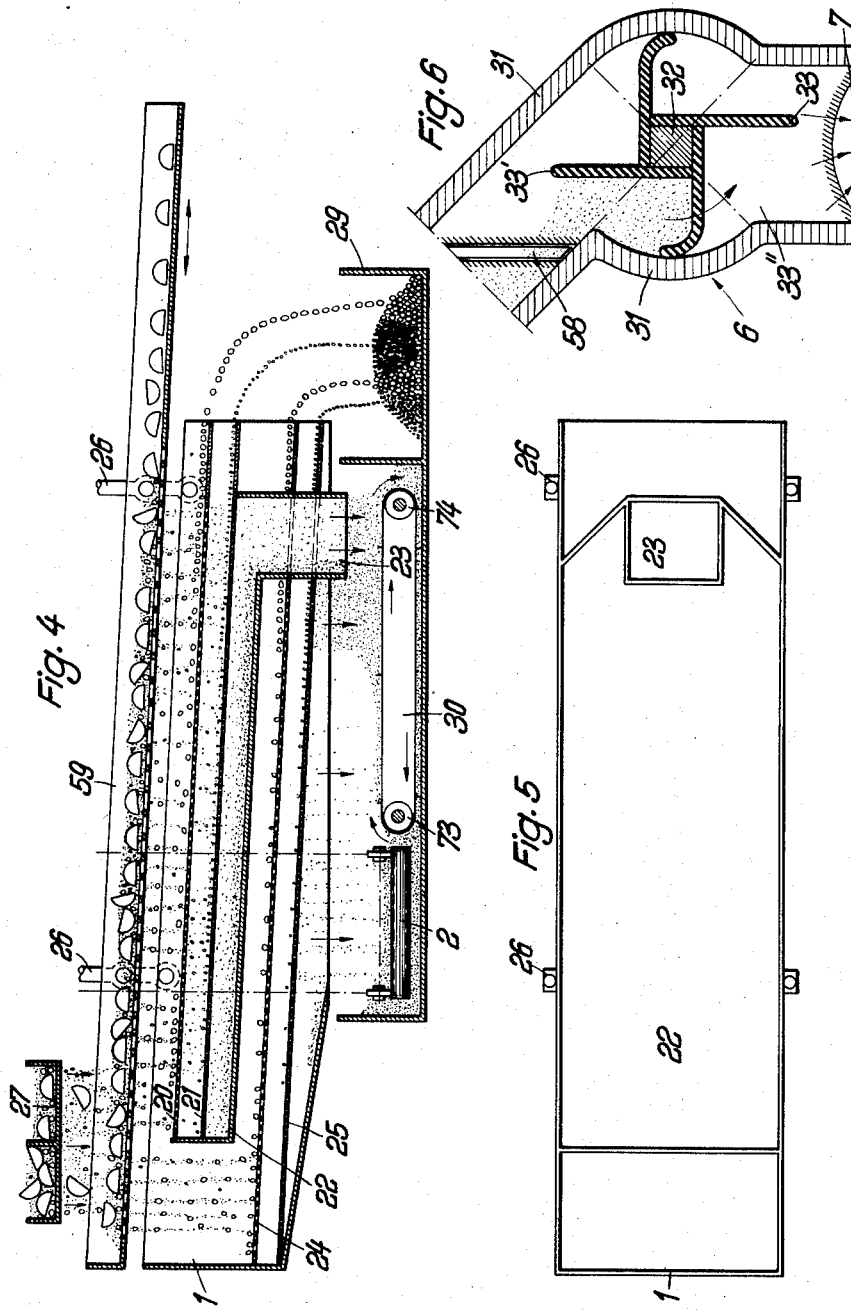

United States Patent Office 2,857,857
Patented Oct. 28, 1958

2,857,857

MACHINE FOR USE IN THE PRODUCTION OF CONFECTIONERY

Richard Winkler, Rengsdorf, near Neuwied, and Kurt Dünnebier, Wollendorf, near Neuwied, Germany Application June 17, 1954, Serial No. 437,506

Claims priority, application Germany July 1, 1953

9 Claims. (Cl. 107—3)

This invention relates to powder cleaning or purifying and drying devices and more particularly to a starch conditioning device such as is used in connection with Mogul-machines for the production of confectionary, for example cream chocolates, filled candies, and the like.

In the production of sweetmeats of the aforesaid and similar kind it is comon practice to use starch cleaning and drying devices in cooperation with a Mogul-machine as, in fact, the proper function of a Mogul-machine largely depends on the cooperation between such Mogul-machine and a starch conditioning device, in which the starch which is used in the production of the said sweets is cleaned, or purified, as by removing therefrom the residues of chocolate, or other solid or semi-solid matter, and eventually dried, all for the purpose of using and reusing the quantities of starch passing through the machine.

The devices which for the said purposes have been employed up to the present, proved inefficient in several respects. One of the drawbacks consisted in that they were installed as self-contained machines separate from the Mogul-machine. They, therefore, required additional floorspace and their separate installation rendered them inadequate and time consuming in operation.

It is, therefore, the principal object of the invention to improve machines, or machine combinations, of the aforesaid kind and to provide a more simplified construction and arrangement, which will also be more efficient in operation and easier to manipulate.

Another object of the invention is to improve the starch cleaning and drying equipments in some of their vital parts so as to render them better adapted for cooperation with the Mogul-machine and, in general, to provide such improvements as will be more apparent as this specification proceeds and which will eventually be pointed out in the claims appended at the end of this specification.

With these and other objects in view the invention primarily consists in improving the said starch conditioning device and to so combine it structurally with a Mogul-machine as to form one unit therewith. It further consists in improving the sifting device for the starch to be cleaned, which allows of a more intimate treatment of the starch and a better distribution to the mold or form boxes as they pass through the cleaning and drying chambers into the molding machine in which the cream or other liquid or semi-liquid filling is applied.

The sifting device in accordance with the invention consists of a plurality of mutually superposed sieves or screens of different mesh and preferably arranged in sections, each section forming a selfcontained unit with independent charging and, preferably, also discharging means. However, it is to be understood, that other sifting means may be provided, which would allow of an intimate treatment of the starch, but the aforesaid arrangement is preferred because of its simplicity of construction and operation. Means are provided, to rock the said screens either singly or collectively and to carry the sifted starch to the form or mold boxes, for which latter purpose, however, separate means may be provided.

A further improvement in a Mogul-machine with a starch cleaning and drying attachment consists, in accordance with the invention, in the provision what hereinafter will be termed a cell roller, which is a roller, or a shaft, with a number of pockets or cells, which collect the starch and transfer it from one compartment or chamber of a certain air pressure to another compartment or chamber of a different air pressure. The said pockets or cells are constituted by wings or blades of resiliently yielding material, which bend while in contact with the inside wall of the surrounding cylindrical casing in which the said roller rotates, so as to produce a tight seal therewith, but which straighten out when they pass the open spaces of the said cylindrical casing. Means is preferably provided for adjusting the size or volume of the cells for the purpose of changing the quantity of starch to be transferred therein.

Further objects and improvements of the invention will be gathered from the accompanying drawings, in which a preferred embodiment is diagrammatically represented by way of example, and in which:

Fig. 1 illustrates a Mogul-machine in side elevation,

Fig. 2 is a plan view of Fig. 1,

Fig. 4 is a longitudinal section through the sifting device on the line IV—IV of Fig. 2.

Fig. 5 is a plan view of one of the rocking sieves shown in Fig. 4, and

Fig. 6 is a cross section through the cell roller for the transfer of the starch from one compartment to the other.

Figure 3:
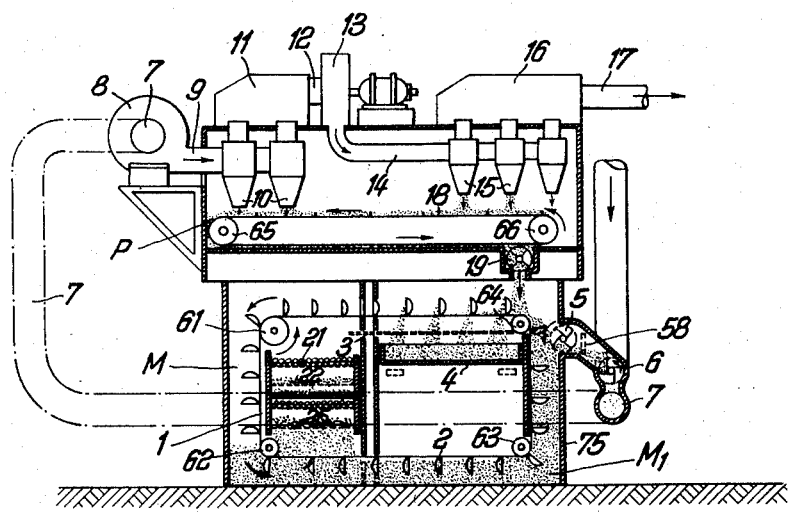
Fig. 3 illustrates a combination of the Mogul-machine and its starch conditioning attachment in a cross section on line III—III of Fig. 1.

In these drawings Fig. 3 indicates the arrangement of the starch powder cleaning device, which is collectively denoted by the letter P, and which is provided with a substantially closed bottom and arranged on top of the Mogul-machine M, $M_1$ (Fig. 3) with which it is in connection through a discharge opening in the bottom and by further means which will be more closely referred to at a later stage of this specification.

In Figs. 2 and 3 the reference numeral 1 denotes a rocking sieve or screen arrangement in the cleaning device through which the starch which is emptied upon it by being tipped from the mold boxes 4 is sifted to be moved away from under the sieve by means of a constantly travelling bucket conveyer 2 which travels in the direction of the arrows over the chain wheel 61, 62, 63 and 64 of which one, for example 61, is driven in any known or convenient manner. By the buckets of this conveyer the starch is deposited partly upon the sieve 3 (Fig. 3) through the meshes of which it is sifted into the mold box 4, and partly by the cell rollers 5 and 6, of which the cell roller 5 is positioned below the chain wheel 64 at the right hand top corner of the conveyor 2, so that part of the starch which has accumulated at the wall 75 of the compartment $M_1$ of the Mogul-machine is taken up by the cell roller 5 and transferred via the cell roller 6 into the conduit 7, through which it is conducted to the drying device of the machine in a manner still to be described. Hot air is drawn through the conduit 7 from a heater (not shown) together with the starch from the cell roller 6 and passed to the ventilator 8, which blows the starch-laden air through a pipe 9 into the cyclones 10, where the largest portion of the starch is extracted. The air which is thus deprived of the largest part of the starch is then sucked through a second ventilator 13 and blown through the collector 11, the pipe 12, and eventually through the pipe 14 into another battery of cyclones 15, in which the last residues of the starch are removed. The now completely purified air escapes through the collector 16 and the exhaust pipe 17. The starch which has been discharged from the cyclones 10 and 15 is moved by scrapers on a belt 18 to the cell roller 19, which returns it into the travelling path of the bucket conveyor 2 in order to be mixed again with that quantity of the starch which has not yet been dried. The scraper belt 18 travels in the direction indicated by the arrows over rollers 65 and 66.

For the purpose of economizing in space the starch sifting arrangement 1 shown in Fig. 4 has its rocking sieves constructed so that always two sieves of different mesh are arranged one above the other and in this way are able to operate both in the same space.

The sieves 20 and 24 are wide-meshed wire gauze or netting. In their operation their retain the larger impurities and allow only the smaller pieces to drop onto the finer sieves, to be retained thereby for removal while the starch passes through the meshes of the sieves. The sifted out lumps and impurities are discharged into a box 29 at the end of the sifting device. During the sifting operation the starch which has fallen through the upper sieves 20 and 21 slides over the inclined bottom 22 and discharges down the vertical duct 23, while from the lower sieves 24 and 25 the starch falls down directly. A scraper chain 30 now moves the starch to the bucket conveyor 2.

It will be seen from the foregoing paragraph that the sifting arrangement in accordance with the invention consists of two halves or units, namely the upper half 20, 21 and the lower half 24, 25.

The admission chute 27 for the starch to be sifted has a double slanted end as can best be seen from Fig. 2, each part being separated from the other by a partition 28. The purpose of this arrangement is to ensure an even distribution of the starch onto the two halves, or units, of the sifting device 1 and, therewith, over the whole width of the sifting device. The sieves are suspended to be reciprocated on links 26. The means for rocking them are not illustrated in the drawings as they may be of any known or convenient kind.

Cell rollers such as shown in Fig. 6 can be installed at the places 5, 6, or 19 in Fig. 3. In order to prevent the starch, which is still damp, sticking to the inner walls of the cylindrical extension 31, the rotary blades 32 are made of a yieldable resilient material, such as rubber or elastic-like materials, so that they bend over when moving in contact with the inner walls 31 and press their outer ends firmly against them. For this purpose the blades are made sufficiently long so as to project in extended condition beyond the inner wall of the extension or casing as shown at 33' in Fig. 6. While scraping along the walls of the casing they assume their bent position, but spring out to fling the starch out of the cell or pocket 33" as soon as they lose contact with the wall.

Inasmuch as the cylindrical casing 31, in which the cell roller 6 rotates, never presents more than a quarter of its clear diameter to the admission and the discharge of the starch, and because at least two of the blades 33 are always in contact with the inner wall of the casing, the latter will always be closed against the space above it and the cell roller 5. In this way a direct communication between the cell rollers 5, 6 and 19 is prevented and, incidentally, the draft of the hot air in pipe 7 will not be able to attract the starch from the cell roller 19 even if starch would fail to enter the cell roller 5.

The volume of the cells or pockets 33" can be changed by means of a slide 58 which regulates the length of the pockets so that more or less starch will be delivered. By so adjusting the quantity of the starch it is possible to maintain, or to alter respectively, the degree of moisture of the starch in the Mogul-machine to suit any requirements in the course of production of the confectionary.

As shown in Fig. 1, motion is derived from a motor 71 and its geared-down pulley or sprocket 72 which, by means of the chain 73, drives the chain wheels 67, 68, 69 and 70. The chain wheel 67 is keyed to the shaft of the roller 66; the chain wheel 68 to the shaft of the cell roller 19; the wheel 69 to the shaft of the cell roller 5, and the wheel 70 to the shaft of the cell roller 6. The scraper chain or belt 30 (Fig. 4) runs over two pairs of rollers 73' and 74, of which 74 may be rotated by the machine drive so as to move the belt as indicated by the arrows.

Two conveyor chains 52 are caused to travel over sprockets 51 in the machine casing 50 (Fig. 1). During their travel these chains withdraw the lowermost of a number of mold boxes 4 from a holder 53, which are filled with starch and finished or partly finished confectionary or the like. When the boxes arrive at the discharge station 54, they are turned over as indicated by the circular arrows at that place, thereby emptying their contents, starch and all, onto the chute 27.

The empty boxes 4 are now refilled with starch (Fig. 3) which is supplied from the bucket conveyor 2, travelling in the direction of the arrows, through a sieve 3. The used starch which accumulates in the chamber M is shovelled by the buckets of the conveyor 2 up against the wall 75 and eventually gets into the cell roller 5, which conveys it to the cell roller 6, which drops it into the hot-air pipe 7.

On the continued travel of the boxes 4 the starch powder contained therein is levelled flat to be flush with the upper margin of the boxes, and when it arrives at the impression position a die or stamp 55 presses the intended shapes of the confectionary into the starch. The boxes, prepared in this way, are then taken over by the chain conveyor 56 and transferred to the casting machine which, not forming part of the invention, is merely indicated at 57 in Fig. 1, where the impressed shapes in the starch are lined with a confectionary coating.

After the contents of the form boxes 4 have been emptied upon the chute 27, they are dropped onto a wide meshed rocking sieve 59 (Fig. 4). The finished pieces of confectionary slip slowly along the sieve to be collected at the end thereof, while the starch and lumps contained therein fall through the meshes of the sieve 59 onto the sieves 20, 21 and 24, 25, from which they are discharged into a trough 29 at the end of the sieves, separated in larger and smaller parts according to the size of the meshes in the sieves. The remaining starch becomes mixed with the new starch and is treated together with same in the aforedescribed manner.

An additional advantage of the arrangement in accordance with the invention consists in that the rocking sieves ensure the sifting out of all the starch with only a certain percentage of it caused to run through the drying chamber, namely that quantity, which is necessary to maintain the required degree of moisture in the Mogul-machine.

What we claim is:

1. A machine for the production of confectionary using starch, consisting of a Mogul-machine and a starch drying and cleaning device operatively connected to the said Mogul-machine, said starch drying and cleaning device comprising, in combination with the Mogul-machine, a starch drying compartment above the said Mogul-machine, a starch cleaning and sifting compartment within the confines of the Mogul-machine, a horizontal partition between the said drying compartment and the cleaning and sifting compartment, a discharge opening in the said partition, and a movable starch distributing member in said opening having pockets for the discharge of measured quantities of dried starch and means for sealing the said compartments one against the other during the operation of the said distributing member.

2. A machine for the production of confectionary as set forth in claim 1, in which the discharge opening in the horizontal partition between the drying compartment and the sifting compartment is in the shape of a depending duct, a rotary shaft in said duct, and resiliently yielding blades on said shaft for contact with the walls of said duct during rotation of the shaft and for forming, between them, pockets for the transfer of measured quantities of starch from the drying compartment to the sifting compartment.

3. In a machine for the production of confectionary using starch, a Mogul-machine, two juxtaposed compartments in the said Mogul-machine, a starch drying device above the Mogul-machine at right angles thereto, a starch sifting device suspended in one of said compartments of the Mogul-machine, means for supplying measured quantities of starch from the drying device to the sifting device, a plurality of superposed sifting sieves of different mesh in said sifting device, means for rocking said sifting device, a chute for delivering confectionary with intermixed starch to the said sieves, and a longitudinally disposed partition at the end of the said chute dividing said end into two separate delivery branches.

4. A machine for the production of confectionary as set forth in claim 3, in which the mutually superposed sieves are of different lengths, while the delivery chute has two substantially juxtaposed slanted ends for the supply, by each end, of starch to sieves of shorter and greater length.

5. A machine for conditioning starch powder for the production of confectionary, comprising, a Mogul-machine, a drying device for the starch above the Mogul-machine, a sifting device in the confines of the Mogul-machine, means for transferring measured quantities of starch from the drying device to the said sifting device, a hot air conduit connecting both the said Mogul-machine and the drying device, an inlet in the said air conduit for the starch to be admitted from the Mogul-machine in moist condition, a centrifugal device in the said air conduit in the drying device for separating the starch which has dried during its passage through the hot-air conduit, a collecting chamber for the air from the said centrifugal device after having discharged part of the starch, another centrifugal device in communication with the said collecting chamber for separating residues of starch from the hot air, and means for transferring measured quantities of the starch so separated to the said sifting device in the Mogul-machine.

6. A machine for the production of confectionary using starch, comprising, a Mogul-machine, two juxtaposed compartments in said Mogul machine, a starch sifting device in one of said compartments, a starch drying device above the Mogul-machine at right angles thereto, a delivery passage between the said drying device and the sifting device, a plurality of mutually superposed sieves in said sifting device, a cell roller rotatable in said delivery passage, a plurality of blades on said cell roller forming between them starch measuring and transferring pockets and extending from the central core of the said roller in substantially radial directions, for transferring starch from the said drying device to the sifting device, a pipe conduit, a stream of hot air in said conduit, and means for continuously transferring measured quantities of starch from the said sifting device into the said conduit.

7. A machine for the production of confectionary using starch, as set forth in claim 6, in which the blades of the said cell roller are of resiliently yielding material and of a length which will cause them to bend when rotated in contact with the inner wall of the said delivery passage and to spring out into stretched position when passing the in and outlet openings therein.

8. In a machine for the production of confectionary as set forth in claim 6, the provision, in addition to the said cell roller in the said delivery passage, of at least one other cell roller in the outer wall of the Mogul-machine at the entrance for the starch into the hot-air conduit.

9. In a machine for the production of confectionary as set forth in claim 6, the provision, in addition to the cell roller in the delivery passage, of two other cell rollers in the outer wall of the Mogul-machine at the entrance for the starch into the hot-air conduit, and of a slide between the said cell rollers for varying the quantity of the starch transferred by the said cell rollers into the hot-air conduit.

References Cited in the file of this patent

UNITED STATES PATENTS

| Number | Name | Date |
| --- | --- | --- |
| 456,336 | Paris | July 21, 1891 |
| 1,627,138 | Bausman | May 3, 1927 |
| 1,693,649 | Harrigan | Dec. 4, 1928 |
| 1,872,284 | Harrigan | Aug. 16, 1932 |
| 2,648,295 | Greenberg et al. | Aug. 11, 1953 |